3,285,732
CONTINUOUS SINGLE-ZONE THERMOPHILIC PHASE COMPOSTING PROCESS
Karl Ludwig Schulze, 148 Spartan Ave., East Lansing, Mich.
Filed Dec. 5, 1963, Ser. No. 329,608
3 Claims. (Cl. 71—9)

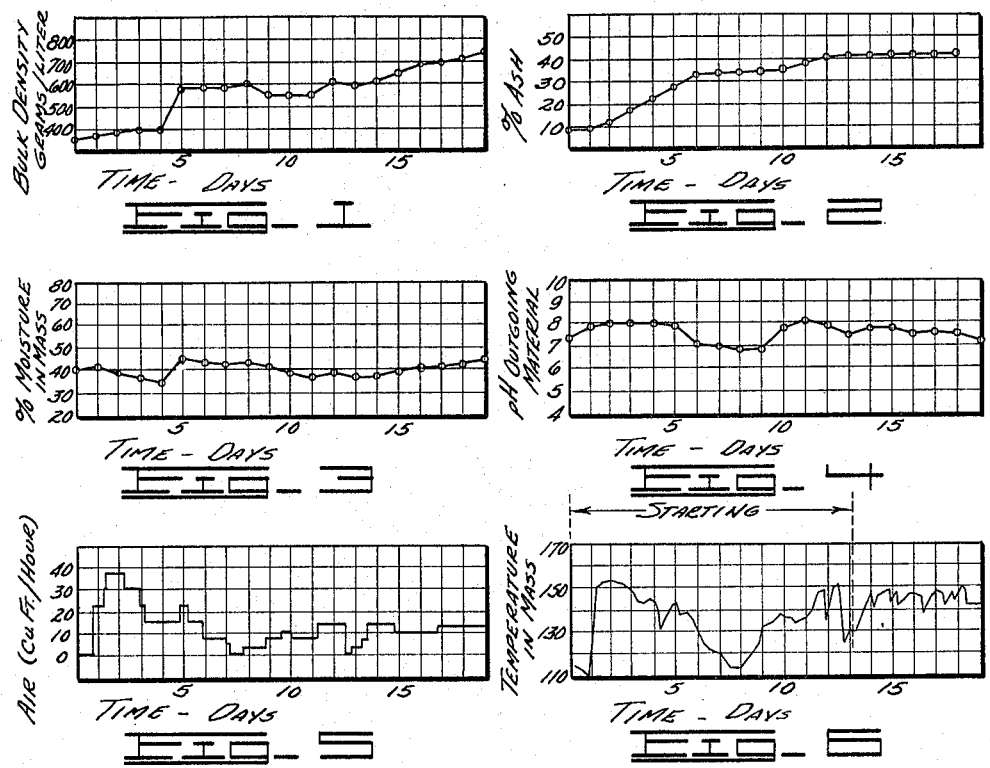
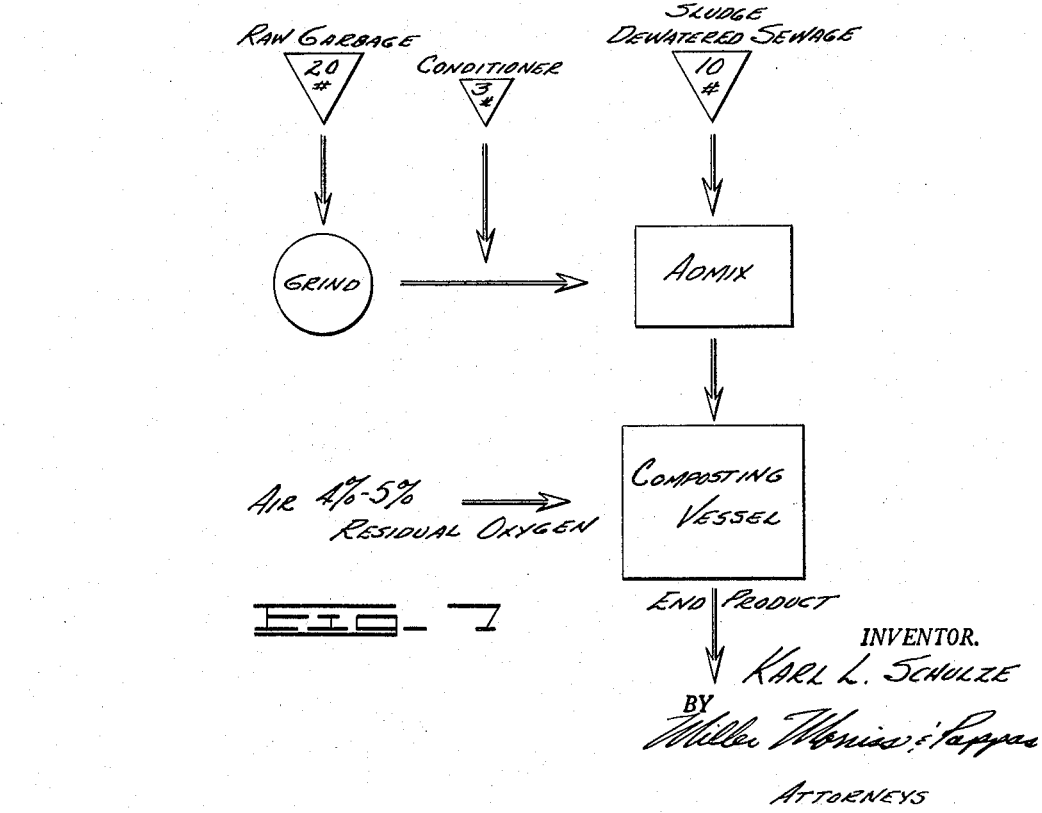

This application is a continuation-in-part of my application Serial No. 43,475, for "Continuous Thermophilic Phase Composting," filed July 18, 1960, and now abandoned.

The present invention relates to continuous thermophilic phase composting and more particularly to a process wherein all of the decomposing material contained within a composting vessel or reactor is continuously maintained at a temperature between about 130 and 160 degrees Fahrenheit thereby creating optimum conditions for aerobic composting which is continuous, maintains its rate of breakdown of organic waste material.

Specifically the present invention relates to a process for aerobic composting which is continuous, maintains its temperature autogenetically and can be practiced without the addition of specific culture other than is chance contained in the organic refuse to be composted.

"Continuous" as applied to the characterization of the present process has reference to the continuous exposure of materials in the composting vessel or reactor to a relatively constant environment within the thermophilic temperature range and without the external application of heat and in marked contrast to prior art processes where an exposure of particles to a thermophilic environment occurs only after a gradual and slow rise in temperature and followed by a similar gradual decrease in temperature toward the end of the process. In the present process portions of raw organic waste materials, preconditioned if necessary to a desirable moisture and bulk density range, are added and mixed directly into a relatively large mass of decomposing material which is maintained continuously in the thermophilic phase, i.e. which possesses a self-generated or outogenetic temperature of 130 to 160 degrees Fahrenheit.

Addition of raw materials to and removal of product from the actively decomposing mass in the reactor may be intermittent and preferably regular or periodic in a manner, condition and quantity which does not interrupt the autogenetic maintenance of the thermophilic temperature range. Fundamentally the average retention time of the particles removed depends on two factors: (1) the complete mixing of the particles within the reactor which assures that all particles have an equal chance of being removed and (2) the replacement rate, i.e. the weight ratio of the material removed over that of the material contained in the vessel. The minimum retention time for any one particle will be determined by the particular feeding and removal cycle or interval chosen in each case.

Unlike all previously known composting procedures, the procedures of the present invention involve the uninterrupted (continuous) maintenance of thermophilic phase temperatures within all of the contents of the reactor or composting vessel.

Composting is a naturally occurring process and the term is used to denote the decomposition of organic waste matter such as sewage sludge, garbage, cannery wastes and vegetable matter, or combinations thereof, by the aerobic and anaerobic activity of microorganisms. During the process part of the organic material is used as an energy source by the microorganisms and is oxidized with the development of heat. The product of such decomposition is called compost or humus. While raw organic waste material represents a public nuisance and a health hazard, compost has great value as a soil conditioner and after proper preparation can even be used as an organic fertilizer.

From a practical point of view, composting processes must be amenable to mass production, must avoid public nuisance while using simple apparatus and must be carried to at least a point where pathogenic organisms are destroyed or rendered harmless so that the organic refuse material has been converted to a product which is safe to handle.

To accomplish this, it is necessary that the process selected be substantially aerobic. In the aerobic process the gaseous product during the microbial activity is primarily carbon dioxide having no objectionable odor. In the anaerobic processes, the organic decomposition proceeds in the absence of oxygen and the volatile and complex organic gases emanating from the process are annoying and noxious. Thus, most commercial attempts at composting have tried hard to maintain the decomposing process in an oxygen containing atmosphere. The present process is also an aerobic process characterized, however, for unusualness in that all of the decomposing material in the composting vessel is continuously maintained in the thermophilic temperature range and further by the fact that organic refuse material is fed directly into the decomposing mass while this mass is in the thermophilic phase. It has been found that the process is able to handle a maximum daily charge of organic refuse material of about one-fifth of the weight of the material contained in the reactor without interrupting the thermophilic phase. Furthermore, the process is started and operated continuously without any inoculation of the raw material with simple or exotic bacterial cultures. Once a stable thermophilic condition has been reached after starting, the product withdrawn is relatively high in nitrogen, possesses optimum pH conditions and is safe to handle. The moisture content is such that the material can either be stored or used directly. In practice it is preferable to provide two to three weeks of storage and curing by reason of the high temperature of the product at removal.

To my knowledge all prior composting procedures have involved three distinct steps generally viewed as essential to the entire operation for producing humus or compost. The first step or initial phase involves the starting of the process so as to achieve the threshold of the thermophilic phase at a temperature of about 110 degrees Fahrenheit. The second step is characterized by the development of high temperatures ranging from 130 to 160 degrees Fahrenheit and is called thermophilic phase. During this phase the destruction of pathogens is achieved. The third step is the declining phase during which the temperature of the decomposing mass gradually recedes toward ambient temperature. This temperature decline usually has been taken as indicative of process completion.

Insofar as is known, the prior closest art in composting processes is best exemplified by the U.S. Letters Patent 2,954,285 to P. M. Carlsson et al., U.S. Letters Patent 2,474,833 to E. W. Eweson and U.S. Letters Patent 2,920,703 to W. C. Dresser et al. Each of these processes presumes a "continuous" flow of material through a composting vessel in either the vertical or horizontal direction. However, raw material is always fed into one end and moves through the vessel to withdrawal at the other end so that each portion of raw material added must gradually pass through the three phases described above: (1) starting, (2) thermophilic and (3) declining phase, before it is discharged. This is in contrast to the presently described process wherein the raw material is directly mixed into an immediate thermophilic environment and remains in that relatively constant environment until removal after a minimum residence time for any one particle of, say, 24 hours and an average residence time for all particles of between 7 and 18 days, depending on the replacement rate or feed rate.

As will be observed, the presently described process utilizes a single achievement of the thermophilic phase at the start. Once this condition has been reached, the process is maintained indefinitely in the thermophilic range by the periodic insertion or addition of raw materials, preconditioned if necessary, and by periodic withdrawal of product so that the composting vessel remains filled to about two thirds of its capacity. Heretofore, the direct admixture of raw materials to the decomposing mass while in the thermophilic phase has been viewed as upsetting the normal sequence of phases and was considered detrimental to a composting process. Raw material which is too moist (moisture content above about 65 percent) and too dense (bulk density above about 400 grams per liter) is not well suited as feed for the present process. In such cases where the moisture content and the bulk weight of the raw materials exceed the values given above, it is advisable to add a conditioner to the mixture such as dry shredded waste paper, sawdust, wood shavings, rice hulls, straw, corncobs, vermiculite, etc.

After the initial charge in the composting vessel has reached the thermophilic temperature range of 130 to 160 degrees Fahrenheit, raw material or a mixture of raw materials, having a bulk density of about 400 grams per liter or less and a moisture content of about 50 to 65 percent is added in regular intervals. From present experience, it appears that such additions can be made daily in amounts weighing up to one-fifth of the weight of decomposing material in the reactor. Withdrawal is also regular as to intervals and in amounts equalling about two-thirds of the input by weight. In any case, withdrawals are regulated so that the reactor is maintained at about two-thirds full. Regular addition and withdrawal in this manner does not interrupt the continuity of the thermophilic phase. The process is carried out in a composting vessel which allows a controlled supply of air and a certain degree of mixing of the decomposing mass, preferably a rotating drum. Air is continuously supplied so as to provide 4 percent to 5 percent residual oxygen by volume in the exhaust gas. The exhaust gas emerging from the reactor carries with it a considerable amount of water as vapor. However, during the decomposition process, nearly an equal amount of water is produced by the oxidation of carbonaceous organic material to $CO_2$ and water. As a result, it has been found that under proper aeration conditions, the moisture content of the product is nearly equal to that of the raw material introduced into the vessel. This simplifies process control considerably. Also, it is obvious that by eliminating the hazards of the usual repeated starting or warm-up phase the composting process gains substantially in stability. Furthermore, since all of the decomposing mass is continuously maintained in the thermophilic phase, the rate of breakdown of the waste material is greatly accelerated. According to previous art, part of the composting apparatus was always occupied by material in the starting and in the declining phase. Since this is avoided in the present process, more efficient use is made of the reactor space.

Thus, the principal object of the present invention is the achievement of a substantially uniform and continuous high temperature within the composting vessel by the regular and direct addition of controlled amounts of prepared raw materials and by the regular and controlled removal of product.

Another of the objects of the present invention is to provide a new and improved aerobic composting process.

Another object is to provide an aerobic composting process possessing greater stability due to the fact that it is continuously maintained in the thermopholic phase.

Still another object is to provide a process wherein the rate of decomposition of organic waste material is greatly accelerated and wherein the end product is free from pathogens and readily adaptable to commercial use due to its uniform quality.

Other objects including obvious simplification of apparatus adaptable to the process will be readily appreciated by those skilled in the art as the description proceeds.

In the drawings:

FIGURES 1 to 6 are graphs demonstrating the approachment of steady state conditions for the decomposing mass inside the reactor from start-up to continuous operation.

FIGURE 1 is a plot of the bulk density of the outgoing material (expressed in grams per liter) versus time. The graph demonstrates that from a starting condition of about 400 grams per liter the bulk density of the product approached about 700 grams per liter after 16 days.

FIGURE 2 is a plot of the percentage of ash (related to dry matter) or fixed solids in the product versus time. The graph shows that steady state was reached after 12 days of operation with an ash content of 40 percent.

FIGURE 3 is a graph which demonstrates that the moisture content of the product was maintained at 40 percent to 45 percent with only minor variations from start-up to continuous operation.

FIGURE 4 is a graph which shows that the pH value of the outgoing materials varied only between 7 and 8 during start-up and continuous operation FIGURE 5 is a graph showing the air supply to the reactor, expressed as cubic feet per hour, and being plotted versus time. The graph shows that after the start-up time of about 12 days, the air supply reached a fairly steady level of 10 cubic feet per hour.

FIGURE 6 is a graph showing a continuous recording of the temperature in degree Fahrenheit of the decomposing mass inside the reactor. This graph demonstrates that after a start-up period of about 13 days, a steady state had been reached with the temperature remaining continuously within the thermophilic range, i.e. between 140 and 150 degrees Fahrenheit.

FIGURE 7 is a flow diagram of the instant process showing the various steps in the preparation of the feed material for a case where 20 pounds of garbage was shredded and mixed with 10 pounds of dewatered sewage sludge and three pounds of conditioner.

In general the graphs in FIGURES 1 to 6 demonstrate that about 15 days after start-up steady state had been reached for practically all parameters involved in the decomposition process and that from thereon operation of the process was continuously in the thermophilic phase. It will be apparent that after stabilization has been reached this process avoids the extreme fluctuations of prior processes both in the operation of the process itself and in the quality of the end product. This assures uniformity of output and makes possible a more efficient design of apparatus. Of extreme importance is the fact that all of the decomposing material in the reactor, after steady state has been reached, is continually exposed to the thermophilic temperature range thereby assuring the substantial elimination of pathogens.

In a specific example a 50 gallon rotating drum was initially charged with 135 pounds of a mixture of garbage, sewage sludge and corn cobs having a moisture content of 50% related to fresh weight, a pH of 6.0 and a bulk-weight of 400 grams per liter. After the charge had heated up to 140 degrees Fahrenheit, 30 pounds of a mixture of 20 pounds raw garbage, 10 pounds of dewatered sewage sludge and 3 pounds of vermiculite were added every day and about 20 pounds of product were removed every day from the drum. Product was always removed before the addition of raw mixture, so that the material removed had a minimum retention time of 24 hours inside the drum. The amount of removal was adjusted so that the drum remained filled to two-thirds of its capacity. As noted above, this averaged about 20 pounds per day or two-thirds of the weight of the raw mixture added.

Before mixing, the garbage was passed through a shredder having a screen with ¾ inch openings. Then the sewage sludge and vermiculite were mixed into the shredded garbage. The sewage sludge was used in the form a moist cake and did not need grinding. The vermiculite was insulating grade and already in granulated form with pieces not over ¾ inch in diameter. Originally the garbage had a moisture content of about 70 percent related to fresh weight, a pH between 4.5 and 6.5 and an ash content of 10 to 25 percent related to dry weight. The analytical data for the sewage sludge were as follows: moisture about 75 percent, pH between 7.0 and 8.0, ash about 60 percent. The bulk weight or bulk density for garbage and sludge ranged from 600 to 800 grams per liter or 38 to 50 pounds per cubic foot. For the vermiculite the analytical data were: moisture 1 percent, pH 5.0, ash 100 percent, bulk weight or bulk density 90 grams per liter. After shreading and mixing of the components the feed material had a moisture content of 50 to 65 percent, a pH of 6.0, an ash content of 25 to 30 percent and a bulk weight or bulky density of about 400 grams per liter. The vermiculite thus served as a conditioner to reduce the moisture and the bulk weight or bulk density of the garbage and the sewage sludge. When used without conditioner, the garbage and sewage sludge were too dense and too moist to provide enough void space for passage of air through the decomposing material. It was found that adjusting moisture and bulk weight of the feed mixture to 50 to 65 percent and about 400 grams per liter respectively produced an optimum texture with 30 to 40 precent void space. Air was continuously supplied to the drum so that the exhaust gas showed a residual oxygen content of 4 percent to 5 percent by volume. Under these conditions about 80 percent of the oxygen contained in the air supply was consumed during the decomposition process inside the drum. Mixing of the decomposing material inside the reactor was provided by rotating the drum for 5 minutes at one revolution per minute before and after the addition of feed. Rotation was used sparingly to avoid packing of the decomposing mass and the formation of clumps.

After the initial charge had reached 140 degrees Fahrenheit, daily feeding in an amount equalling about one-fifth of the weight of the decomposing mass in the composting vessel and withdrawal of product from the composting vessel was continued for 23 days until a new experiment with a different type of feed material or feed cycle was begun. During this period, the temperature inside the drum maintained itself remarkably stable between 130 and 160 degrees Fahrenheit. The characteristic data for the contents of the drum and therefore for the product were as follows: moisture 55 percent to 60 percent, ash about 45 percent, pH 6.0 to 7.0, bulk weight or bulk density of about 700 grams per liter. The increase in percent ash and in bulk weight as against the raw material is an indication of the substantial breakdown of organic waste material occurring inside the drum due to the continuously maintained thermophilic temperature range. In fact, the data show that on the average the organic matter of the feed material had been reduced by 30 to 40 percent during the thermophilic composting process. According to all information available there are no pathogens which can resist a 24 hour exposure to temperatures between 130 and 160 degrees Fahrenheit at a relative humidity of 100 percent. Thus, the product can be assumed to be essentially free from pathogens and safe to handle. This is an important feature from a public health point of view since sewage sludge contains a high concentration of pathogens. No foul odor was noted in the material freshly removed from the drum. After removal, the product was stored in an open bin. After two to three weeks of storage and curing the temperature of the product had declined to ambient and the product had acquired a pleasant humus or greenhouse odor and was well suited as a soil conditioner or organic fertilizer.

While vermiculite was used in the example cited, similar experiments were conducted where shredded waste paper, either alone or in combination with air dried sewage sludge or dry compost was used to adjust the moisture and the bulk weight of the feed mixture. In other experiments, different feed cycles and different feed rates were used such that, for instance, the weight of the prepared feed material added per day to the reactor was less than one-fifth of the weight of decomposing material contained in the reactor or such that raw organic waste material was added and product withdrawn every 48 hours.

The results were equally good as those reported for the example cited in detail. In general, the data indicate that a daily charge of about one-fifth of the weight of the decomposing material contained in the composting vessel represents the maximum loading rate for the continuous thermophilic process.

It is obvious that besides the vermiculite and waste paper mentioned above, other dry organic waste materials such as corn corbs, straw, rice hulls, peanut shells, saw dust and wood shavings, etc., can also be used as conditioners. Furthermore, it may be pointed out that when shredded city refuse is used as raw material, no conditioner may be needed since this type of raw material usually has the required texture for composting.

Having thus described my process invention, a wide variety of improvements, modifications and changes will suggest themselves to those skilled in the art. Such modifications are intended to be included herein, limited in scope only by the hereinafter appended claims.

I claim:
1. A continuous single phase process for aerobic decomposition of organic material operated continuously in the thermophilic phase which includes the steps of:
   (a) introducing undecomposed organic material at ambient temperature directly into a composting vessel containing a mass of decomposing material all of which decomposing material in said composting vessel is continuously maintained in the thermophilic phase at a temperature range between about 130 degrees and about 160 degrees Fahrenheit,
   (b) agitating said decomposing mass in said composting vessel so that said introduced undecomposed organic material is thoroughly intermixed with said decomposing mass in said composting vessel,
   (c) withdrawing product at a temperature range between about 130 and 160 degrees Fahrenheit directly from said mass of decomposing material maintained in said thermophilic phase so that the introduction of said undecomposed organic material into said composting vessel and the withdrawal of said product from said composting vessel is balanced to maintain said thermophilic temperature range in said decomposing mass and to maintain a preset operating level of said decomposing mass in said composting vessel, so that substantially every particle removed from said vessel has been subjected to said thermophilic temperature range for a minimum of 24 hours, and
   (d) supplying oxygen containing gas to said decomposing mass in said composting vessel at a rate such that the exhaust gas from said decomposing mass contains residual oxygen.

2. A cintinuous single phase process for aerobic decomposition of organic material operated continuously in the thermophilic phase which includes the steps of:
   (a) periodically introducing undecomposed organic material at ambient temperature directly into a composting vessel containing a mass of decomposing material all of which decomposing material in said composting vessel is continuously maintained in the thermophilic phase at a temperature range between about 130 degrees and about 160 degrees Fahrenheit, (b) agitating said decomposing mass in said composting vessel so that said introduced undecomposed organic material is thoroughly intermixed with said decomposing mass in said composting vessel, (c) periodically withdrawing product at a temperature range between about 130 and 160 degrees Fahrenheit directly from said mass of decomposing material maintained in said thermophilic phase so that the introduction of said undecomposed organic material into said composting vessel and the withdrawal of said product from said composting vessel is balanced so that the weight of said undecomposed organic material added per 24 hours to said composting vessel and the weight of said product removed per 24 hours from said composting vessel is equal to one fifth or less of the weight of said decomposing material in said vessel represented by said operating level in said composting vessel, so that substantially every particle removed from said vessel has been subjected to said thermophilic temperature range for a minimum of 24 hours, and (d) supplying oxygen containing gas to said decomposing mass in said composting vessel at a rate such that the exhaust gas from said decomposing mass contains residual oxygen.

3. A continuous composting process for the aerobic decomposition of organic waste material comprising the steps of:

(a) maintaining in the thermophilic phase, at a self-generated temperature range of about 130 degrees Fahrenheit to about 160 degrees Fahrenheit all of a decomposing mass of organic waste material contained in a composting vessel, said mass filling said vessel to a selected operating level;

(b) periodically withdrawing product from said composting vessel at minimum intervals of about 24 hours in a volume such as to permit subsequent insertion of undecomposed organic waste material in an amount not in excess of about one fifth of the weight of said decomposing mass per day;

(c) intermittently inserting directly into said decomposing mass, to restore said operating level of said decomposing mass, a volume of undecomposed shredded organic waste material possessing a maximum bulk density of about 30 pounds per cubic foot and a maximum moisture content of about 65 percent related to fresh weight;

(d) agitating said decomposing mass in said composting vessel periodically so that said added amounts of undecomposed organic waste material are thoroughly intermixed with said decomposing mass in said composting vessel;

(e) supplying air to said decomposing mass in said composting vessel at a rate such that the exhaust gas from said composting vessel contains residual oxygen.

References Cited by the Examiner

UNITED STATES PATENTS

| 1,597,724 | 8/1926 | Cooke | 71—9 |
| 2,954,285 | 9/1960 | Carlsson et al. | 71—9 |
| 2,969,279 | 1/1961 | Pierson | 71—9 |
| 3,041,157 | 6/1962 | Crane et al. | 71—9 |

DONALL H. SYLVESTER, *Primary Examiner.*

ANTHONY SCIAMANNA, S. LEON BASHORE, T. D. KILEY, *Assistant Examiners.*